United States Patent [19]

Peckenpaugh, Sr. et al.

[11] Patent Number: 5,450,956

[45] Date of Patent: Sep. 19, 1995

[54] ADJUSTABLE, TELESCOPIC CARRYING AND STORAGE CASE OF VARIABLE LENGTH

[75] Inventors: Richard D. Peckenpaugh, Sr.; James M. Abel, both of Katy, Tex.

[73] Assignee: P&A Enterprises, Inc., Katy, Tex.

[21] Appl. No.: 187,853

[22] Filed: Jan. 28, 1994

[51] Int. Cl.⁶ .................................................. B65D 85/00
[52] U.S. Cl. ................................ 206/315.11; 220/8
[58] Field of Search ...................... 206/315.11; 220/8

[56] References Cited

U.S. PATENT DOCUMENTS

| | | | |
|---|---|---|---|
| D. 226,407 | 2/1973 | Doman | 220/8 X |
| 2,143,720 | 1/1939 | Smith et al. | 220/8 |
| 2,919,017 | 12/1959 | Weber | 206/1 |
| 3,447,254 | 6/1969 | Sobel et al. | 43/18 |
| 3,744,687 | 7/1973 | Oreck | 220/8 X |
| 3,811,216 | 5/1974 | Sauey et al. | 43/26 |
| 3,921,871 | 11/1975 | Heil | 220/8 X |
| 4,161,268 | 7/1979 | Heil | 220/8 X |
| 4,171,588 | 10/1979 | Hoffman et al. | 43/26 |
| 4,643,302 | 2/1987 | Baumgardner | 220/8 X |
| 5,005,743 | 4/1991 | Ramsay | 224/202 |
| 5,046,279 | 9/1991 | Smith et al. | 43/26 |
| 5,259,140 | 11/1993 | Epperson | 43/18.1 |

FOREIGN PATENT DOCUMENTS

| | | | |
|---|---|---|---|
| 182690 | 5/1986 | European Pat. Off. | 220/8 |
| 2224916 | 5/1990 | United Kingdom | 206/315.11 |

Primary Examiner—Bryon P. Gehman
Attorney, Agent, or Firm—Maryam Bani-Jamali

[57] ABSTRACT

An adjustable, telescopic, carrying and storage case of variable and fixed length includes a hollow adjustable, telescopic front member of variable length and a hollow adjustable, telescopic rear member of variable length that can be separated or connected tightly. The case is adjustable in length and can be used at a maximum length and at a minimum length for ease in transportation. The case is preferably used for carrying and storing different items including telescopic fishing rod assemblies. The telescopic front member comprises a first container portion and a plurality of adjustable front telescopic locking sections which are placed in an interlocking relationship through a plurality of annular tapered locking surfaces and a number of annular locking surfaces. The telescopic rear member comprises a second container portion and a plurality of adjustable rear telescopic locking sections which are placed in an interlocking relationship through a plurality of annular tapered locking surfaces and a number of annular locking surfaces.

16 Claims, 6 Drawing Sheets

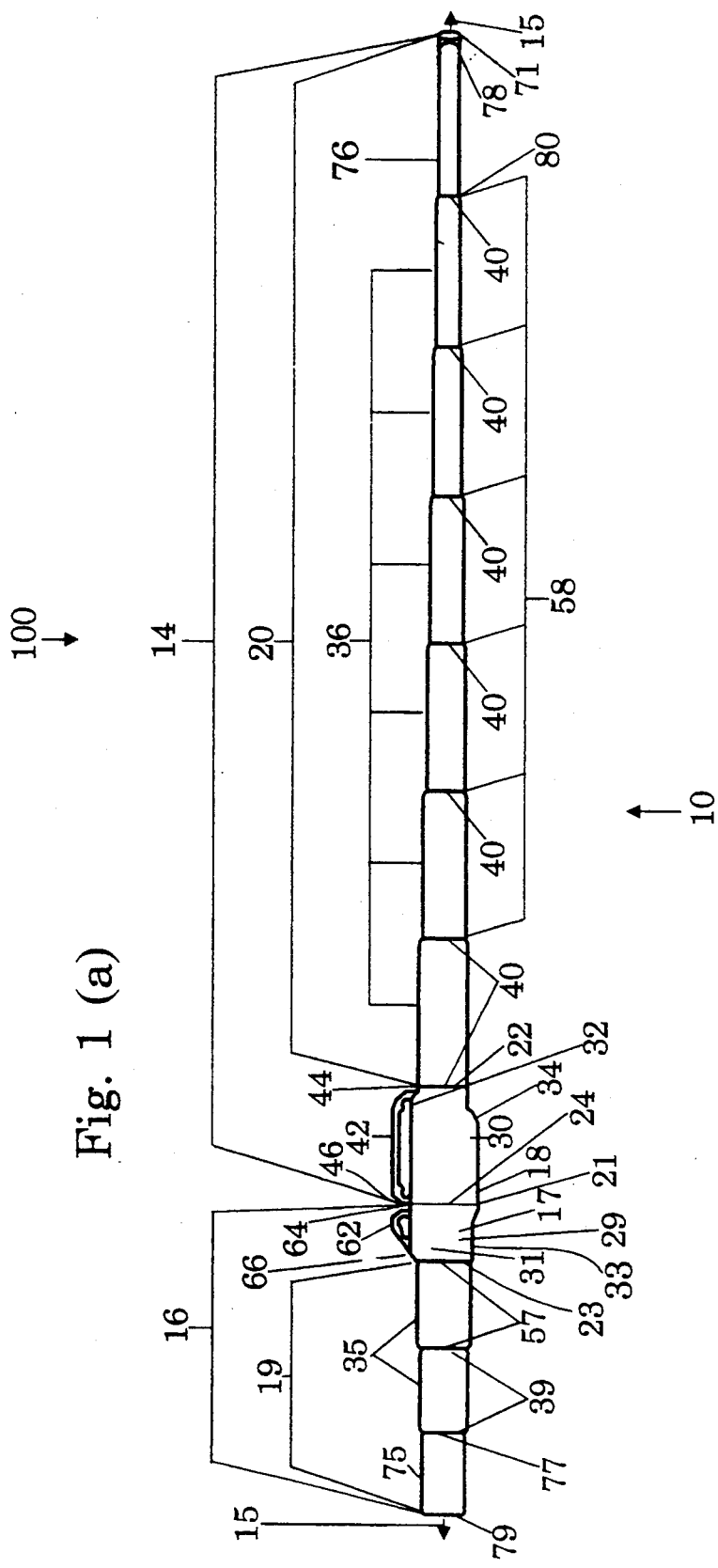
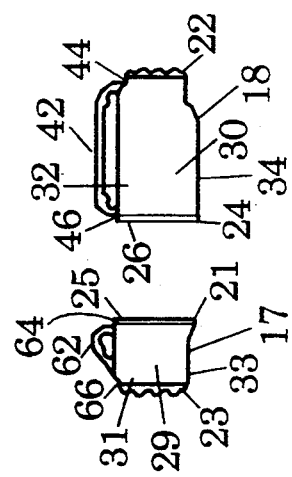
Fig. 1 (a)
Fig. 1 (b)

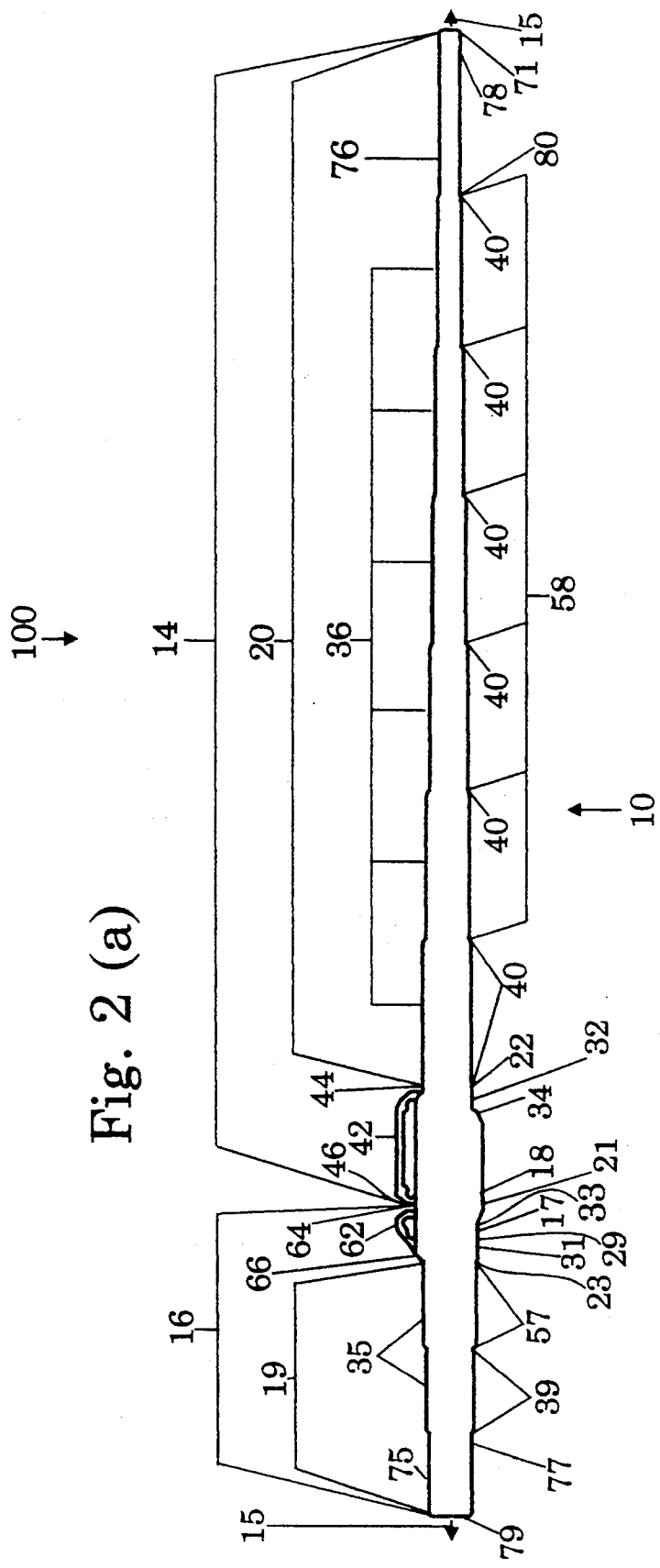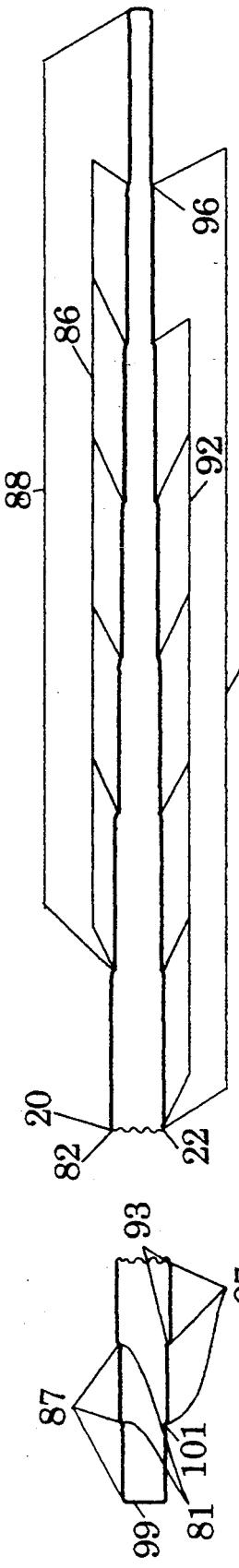
Fig. 2 (a)
Fig. 2 (b)
Fig. 2 (c)

ADJUSTABLE, TELESCOPIC CARRYING AND STORAGE CASE OF VARIABLE LENGTH

BACKGROUND OF THE INVENTION

Different versions of carrying and storage cases are known for use in carrying and storage of various articles, such as fishing rods and ski equipment. However, most of these cases have a common disadvantage: they are bulky and hard to carry when empty. The case designed in U.S. Pat. No. 5,005,743 is useful in carrying ski equipment. However, the size of the case itself is not diminishable during the transportation of an equipment that is itself diminishable in size such as a telescopic fishing rod. The case designed in U.S. Pat. No. 4,171,588 is not efficient either. That case comprises two major portions such that the length of the case is not diminishable during transportation.

A telescopic case has several advantages. It accounts for contents of different length and different size. Through interlocking adjustable telescopic sections, the length of the case may be varied.

Since the contents may be very delicate, a need exists for protecting the contents from any potential impacts. Through paddings of foam, such contents may be protected.

The case should not fall apart easily. Interlocking surfaces are present that are capable of holding the case at a fixed length and keeping the telescoping sections stable and with minimal movement.

At the time of storage, some cases are very bulky to deal with. The telescopic case is adjustable to a minimum length.

In addition, an object of this invention is to provide an inexpensive method of producing a telescopic case.

BRIEF SUMMARY OF THE INVENTION

According to the present invention there is provided an adjustable, telescopic, carrying and storage case of variable length that can be used both in a retracted position and in an extended position conveniently. The case comprises a hollow, adjustable front member comprising a hollow first container portion with an open front end and an open rear end. The case also comprises a hollow, adjustable rear member comprising a hollow second container portion with an open front end and an open rear end. Preferably, the container portions are interlocked or taken apart from each other conveniently through a pair of interlocking surfaces located at the open rear end of the first container portion and at the open front end of the second container portion.

The hollow, adjustable front member comprises a plurality of adjustable, front telescopic locking sections and the hollow, adjustable rear member comprises a plurality of adjustable rear telescopic locking sections. The adjustable front telescopic locking sections comprise a number of primary and a final telescopic locking sections. The number of primary front telescopic locking sections is arranged telescopically in relation to the first container portion and the front telescopic locking sections are arranged in a telescopic relationship with each other. Similarly, the adjustable rear telescopic locking sections comprise a number of primary and a final telescopic locking sections. The number of primary rear telescopic locking sections is arranged telescopically in relation to the second container portion and the rear telescopic locking sections are arranged in a telescopic relationship with each other.

Interlocking surfaces between each pair of adjacent sections keep the case in a fixed position when extended or retracted, thus allowing the case to be used at variable lengths to carry or store items of different size and length, including but not limited to fishing rods. These interlocking surfaces are variable. Preferably, the length of the case at its maximum retraction is ⅓th of the length of the case at maximum extension. Preferably, annular tapered surfaces as well as annular bumped surfaces are used to prevent the sections from moving in or out while extended or retracted.

A handle may be placed on the first container portion or on the second container portion, or on both, to facilitate transportation. Preferably, two handles are used.

The case may be blow molded, preferably with a closed rear end on the final rear telescopic section and a closed front end on the final front telescopic section. Another preferred cast for blow molding the case will create a case with an open rear end on the final rear telescopic section and an open front end on the final front telescopic section. A preferred method of covering the case is by using plastic caps.

BRIEF DESCRIPTION OF THE DRAWINGS

FIG. 1(a) shows a side view of the carrying and storage case when extended to its full length, illustrating the case in its preferred embodiment, FIG. 1(b) shows a side view of the first and second container portions taken apart.

FIG. 2(a) shows a cross-sectional view of the carrying and storage case when extended to its full length, FIG. 2(b) shows, a cross-sectional view of a rear member of the case FIG. 2(c) shows a cross-sectional view of a front member of the case.

DETAILED DESCRIPTION OF PREFERRED EMBODIMENT

Figure 3:
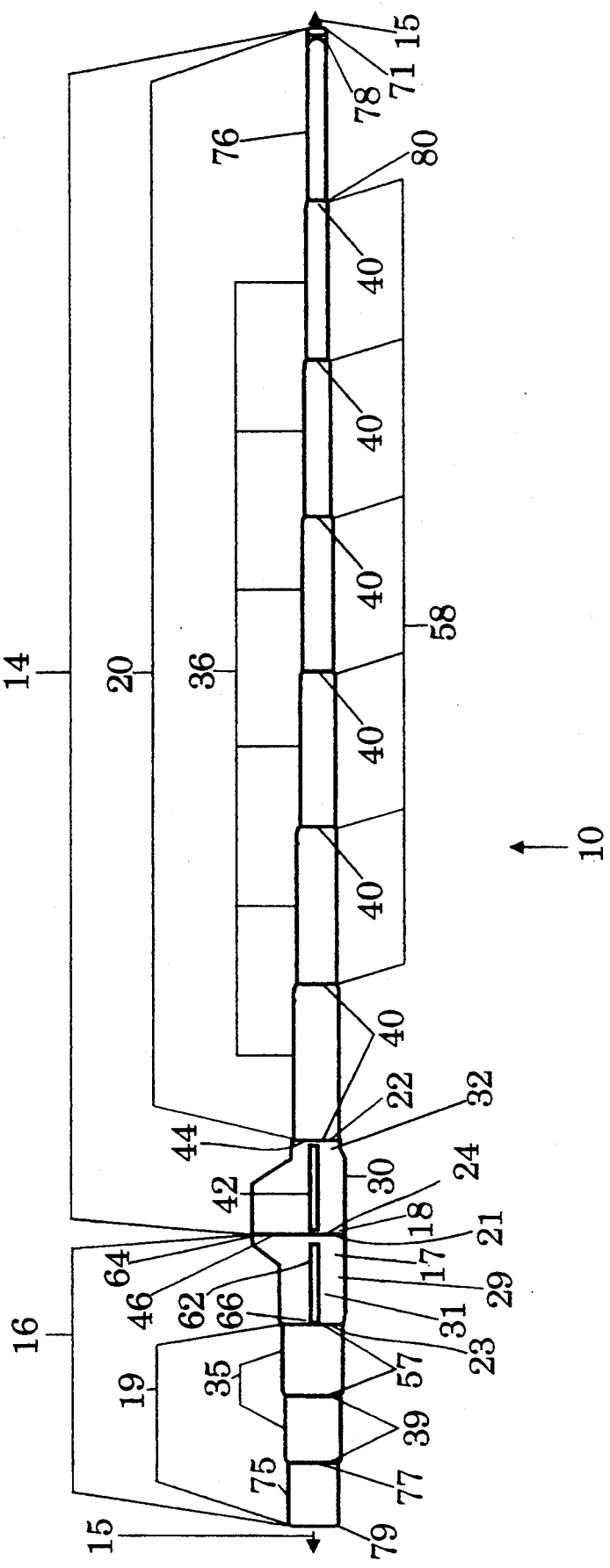
FIG. 3 shows a top view of the carrying and storage case when extended to maximum length illustrating the front member with an open front end and the rear member with an open rear end.
Figure 4:
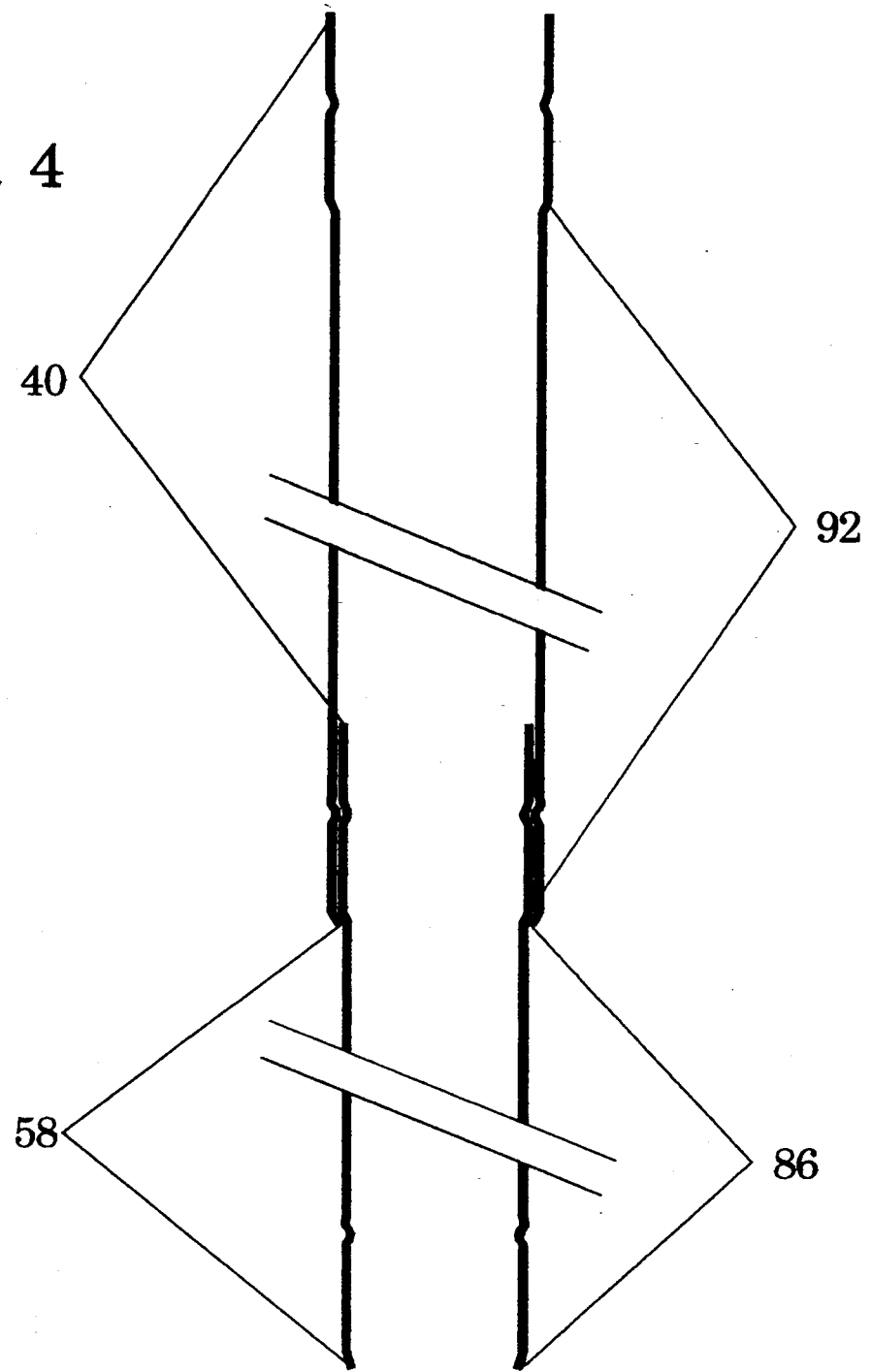
FIG. 4 shows an enlarged, fragmented view illustrating the cooperating overlapping surfaces on the components to establish an annular tapered locking surface.
Figure 5:
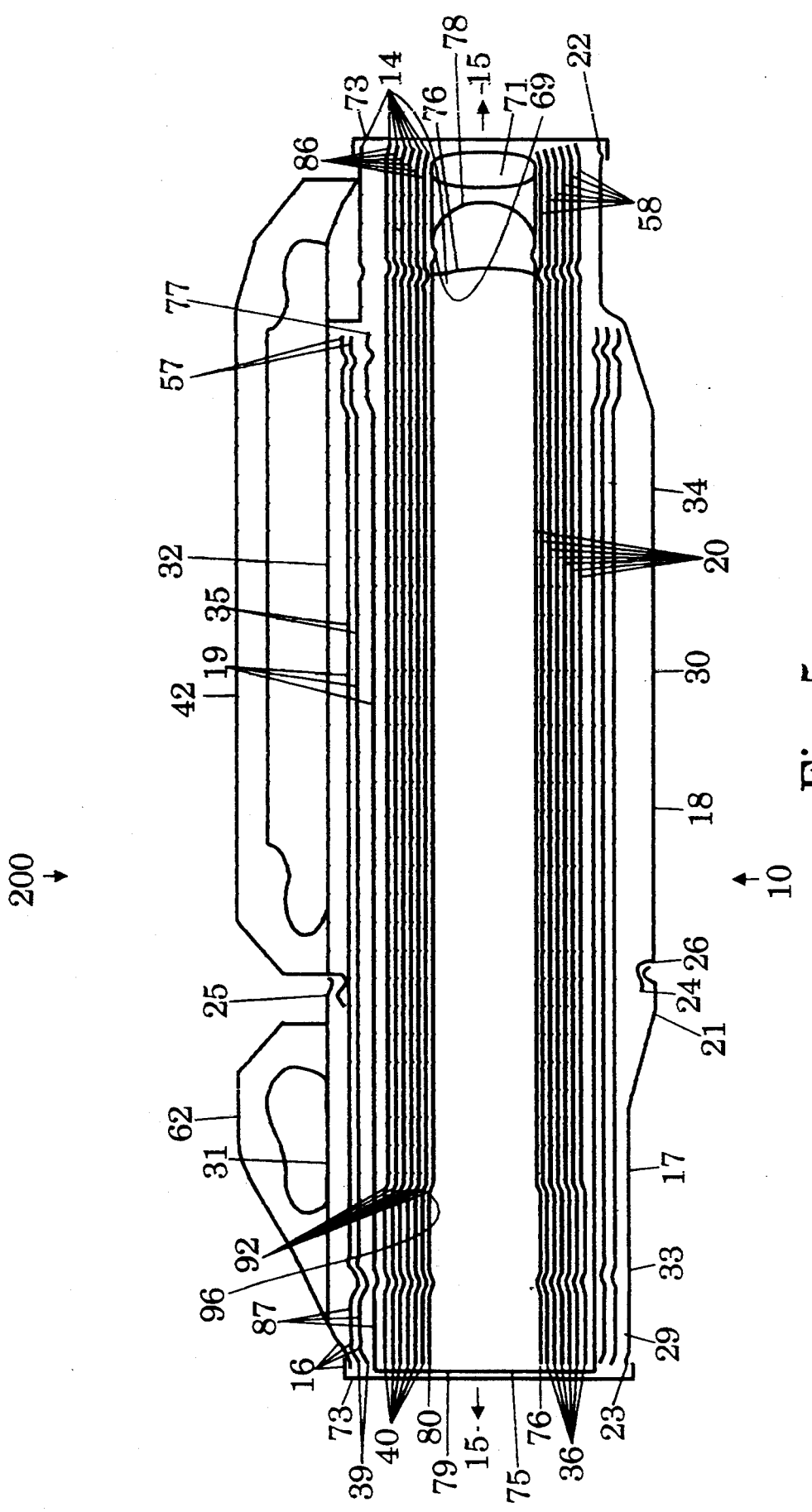
FIG. 5 shows a side cross-sectional view of the carrying and storage case when closed to its minimum length with a final front telescopic locking section with a closed end and a final rear telescopic locking section with a closed end each closed end being covered by a cap.
Figure 6:
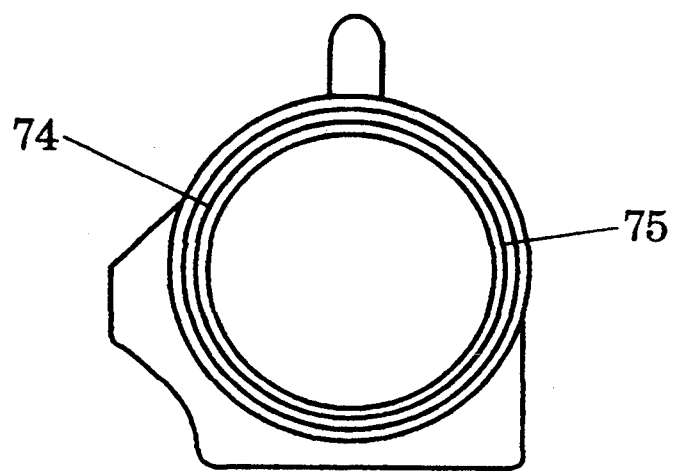
FIG. 6 shows a cross-sectional view of the carrying and storage case to its minimum length from a rear end when having an open end, and shows.

In more detail, the drawings in FIGS. 1 to 6 present a preferred embodiment of an adjustable, telescopic, carrying and storage case 10 of variable length in an extended position 100 (FIG. 1(a)) and in a retracted position 200 (FIG. 5. In an extended position 100 (as shown on FIGS. 1(a) and 3), the adjustable, telescopic, carrying and storage case 10 comprises a hollow, adjustable front member 14 of variable length with a central longitudinal axis 15, and a hollow, adjustable rear member 16 of variable length with the central longitudinal axis 15. The rear member 16 is concentric with the front member 14 when the front member 14 and the rear member 16 are connected to each other. The adjustable front member 14 comprises a hollow first container portion 18 and a plurality of adjustable front telescopic locking sections 20 of variable length.

As shown on FIG. 1(b), the hollow first container portion 18 comprises an open front end 22 and an open rear end 24, a rear lip 26 located adjacent to the open rear end 24, a body 30 comprising a top part 32 and a bottom part 34, the body 30 connecting the open front end 22 to the open rear end 24 of the first container portion 18.

As shown on FIGS. 1(a) and 3, the first container portion 18 is connectable in a telescopic relation to the plurality of adjustable front telescopic locking sections 20 of variable length. The plurality of adjustable front telescopic locking sections 20 comprises a number of primary adjustable front telescopic locking sections 36 with a number of open rear ends 40 (refer to FIG. 4) which telescopically follows the first container portion 18, said number of open rear ends 40 telescopically following each other and a number of open front ends 58 (refer to FIG. 4) which is arranged telescopically, with respect to each other whenever the number of open front ends 58 is greater than one and a final adjustable front telescopic locking section 76 with a closed front end 78 and an open rear end 80 which follows the number of primary adjustable front telescopic locking sections 36.

The first container portion 18 is arranged telescopically in relation to the number of primary adjustable from telescopic locking sections 36. The number of primary adjustable from telescopic locking sections 36 is arranged in a telescopic relation with each other whenever the number is greater than one and with the final adjustable front telescopic locking section 76 for movement between a retracted position 200 (FIG. 5) of the adjustable, telescopic, carrying and storage case 10 and an extended position 100 (FIG. 1(a)) of the case 10. The number of primary adjustable from telescopic locking sections 36 is slidable through the open front end 22 of the first container portion 18. The final adjustable front telescopic locking section 76 is slidable through one of the number of open front ends 58 of the number of primary front telescopic locking sections 36 which is farthest from the first container portion 18.

In FIGS. 2(a), 2(b) and 2(c), the plurality of adjustable from telescopic locking sections 20 comprises a plurality of front annular tapered locking surfaces 88 (see FIG. 2(c) for identification of interlocking elements) and a plurality of rear annular tapered locking surfaces 98 for retaining the plurality of adjustable front telescopic locking sections 20 in an interlocked relationship when the case 10 is in an extended position 100. A from annular tapered locking surface 82 is located adjacent to the open front end 22 of the first container portion 18. A number of front annular tapered locking surfaces 86 (FIG. 4) is located adjacent to the open front end 58 of the number of primary adjustable from telescopic locking sections 36. The plurality of from annular tapered locking surfaces 88 (not shown on FIG. 5) is located at an angle with the central longitudinal axis 15. A rear angle is formed between the plurality of rear annular tapered locking surfaces 98 and the central longitudinal axis 15. A number of primary rear annular tapered locking surfaces 92 (FIG. 4) is located adjacent to the respective number of rear ends 40 of the number of primary adjustable front telescopic locking sections 36. A final rear annular tapered locking surface 96 is located adjacent to the rear end 80 of the final adjustable front telescopic locking section 76. The plurality of from annular tapered locking surfaces 88 and the plurality of rear annular tapered locking surfaces 98 act as pairs of interlocking elements to lock the open front end 22 of the first container portion 18 and of the number of open front ends 58 of the number of primary adjustable front telescopic locking sections 36 with the number of open rear ends 40 of the number of primary adjustable front telescopic locking sections 36, and with the open rear end 80 of the final adjustable front telescopic locking section 76, with each end telescopically locked with each following end.

As shown in FIG. 1(a), the adjustable rear member 16 comprises a hollow second container portion 17 and a plurality of adjustable rear telescopic locking sections 19 of variable length. As shown in FIG. 1(b), the hollow second container portion 17 comprises an open front end 21 and an open rear end 23, a front lip 25 located adjacent to the open front end 21 of the second container portion 17, and a body 29 comprising a top part 31 and a bottom part 33. The body 29 connects the open front end 21 to the open rear end 23. As demonstrated in FIG. 1(a), the second container portion 17 is connectable in a telescopic relation to the plurality of adjustable rear telescopic locking sections 19 of variable length.

As shown in FIGS. 1(a) and 3, the plurality of adjustable rear telescopic locking sections 19 comprises a number: of primary adjustable rear telescopic locking sections 35 with a number of open rear ends 39 telescopically following the second container portion 17, such number of open rear ends 39 telescopically following each other whenever the number of open rear ends 39 is greater than one, open front ends 57 which are arranged telescopically with respect to each other whenever the number of open front ends 57 is greater than one and a final adjustable rear telescopic locking section 75 with an open front end 77 and a closed rear end 79 following the number of primary adjustable rear telescopic locking sections 35. The number of primary adjustable rear telescopic locking sections 35 is arranged telescopically in relation to the second container portion 17 and with respect to each other whenever the number of primary adjustable rear telescopic locking sections 35 is greater than one and in relation to the final adjustable rear telescopic locking section 75 for movement between a retracted position 200 (as in FIG. 5) of the adjustable, telescopic, carrying and storage case 10 and an extended position 100 (as in FIG. 1(a)) of the case 10. The number of primary adjustable rear telescopic locking sections 35 is slidable through the open rear end 23 of the second container portion 17 and through the number of open rear ends 39 59 of each other if the number of primary rear telescopic locking sections 35 is greater than one. The final adjustable rear telescopic locking section 75 is slidable through one of the number of open rear ends 39 of the number of primary adjustable rear telescopic locking sections 35 which is farthest from the second container portion 17.

As shown in FIGS. 2(a), 2(b) and 2(c), a plurality of from annular tapered locking surfaces 97 is located adjacent to each of the number of open front ends 57 of the plurality of adjustable rear telescopic locking sections 19. A plurality of rear annular tapered locking surfaces 87 is located adjacent to each of the number of rear ends 39 of the plurality of adjustable rear telescopic locking sections 19. The plurality of front annular tapered locking surfaces 97 is located at an angle with the central longitudinal axis 15 of the rear member 16. A rear angle is formed between the plurality of rear annular tapered locking surfaces 87 and the central longitudinal axis 15. Thus, a number of primary front annular tapered locking surfaces 93 located adjacent to the respective number of open front ends 57 of the number of primary adjustable rear telescopic locking sections 35 and a final front annular tapered locking surface 101 located adjacent to the open front end 77 of the final adjustable rear telescopic locking section 75 interlock with a rear annular tapered locking surface 99 located adjacent to the open rear end 23 of the second container portion 17, a number of primary rear annular tapered locking surfaces 81 located adjacent to the respective number of rear ends 39 of the number of primary adjustable rear telescopic locking sections 35. The plurality of front annular tapered locking surfaces 97 and the plurality of rear annular tapered locking surfaces 87 act as pairs of interlocking elements to lock the open rear end 23 of the second container portion 17 and of the number of open rear ends 39 of the number of primary adjustable front telescopic locking sections 35 with the number of open front ends 57 of the number of primary adjustable rear telescopic locking sections 35, and with the open front end 77 of the final rear telescopic locking section 75, with each end telescopically locked with a following end.

As shown on FIG. 1(b), the hollow second container portion 17 is connectable to the hollow first container portion 18 through the front lip 25 located adjacent to the open front end 21 of the second container portion 17 and the rear lip 26 located adjacent to the open rear end 24 of the first container portion 18. The front lip 25 and the rear lip 26 act as a set of interlocking elements to keep the front end 21 of the second container portion. 17 in an interlocked relationship with the rear end 24 of the first container portion 18 and to retain the carrying and storage case 10 in a stable condition.

As shown on FIGS. 1(a) and 3, in the carrying and storage case 10, there is preferably a first hollow rigid handle 42 located on the top part 32 of the body 30 of the first container portion 18. The first hollow rigid handle 42 is an integral part of the first container portion 18 and extends between a first position 44 adjacent to the open front end 22 of the first container portion 18 and a second position 46 adjacent to the open rear end 24 of the first container portion 18. Preferably, there is also a second hollow rigid handle 62 located on the top part 31 of the body 29 of the second container portion 17 and is an integral part of the second container portion 17. The second handle 62 extends between a first location 64 adjacent to the open front end 21 of the second container portion 17 and a second location 66 adjacent to the open rear end 23 of the second container portion 17. At least one of the first 42 and second handles 62 will be integrally formed with the first container portion 18 or second container portion 17, respectively, to assist in carriage.

As shown on FIG. 5, in the carrying and storage case 10, the front end 78 of the adjustable front member 14 and the rear end 79 of the adjustable rear member 16 may be covered by using caps 73 (as shown in FIG. 6(c)) made of material comprising plastic. Another option is to assure that the final adjustable front telescopic locking section 76 comprises an open front end 72 (refer to FIG. 6(a)) and to assure that the final adjustable rear telescopic locking section 75 comprises an open rear end 74, with the open front end 72 being an integral part of the final adjustable front telescopic locking section 76 and the open rear end 74 being an integral part of the final adjustable rear telescopic locking section 75. (Please refer to FIG. 6(b)). In addition, the final adjustable front telescopic locking section 76 may comprise a pull tab 71 which may extend outside the final adjustable front telescopic locking section 76 (FIGS. 5 and 6(a)) and may be located adjacent to a closed front end 72 (FIG. 5) on one side and adjacent to a retainer ring 69 retaining a soft material comprising foam on an opposite side (FIG. 5).

As shown on FIG. 1(a), the carrying and storage case 10 is approximately cylindrical in form. The bottom part 34 of the first container portion 18 and the bottom part 33 of the second container portion 17 may be partially flattened and partially creased to avoid slipperiness and to increase rigidity of the case 10.

Preferably, the front member 18 and the rear member 17 of the carrying and storage case 10 are formed by blow molding.

Preferably, the carrying and storage case 10 are used for the storage and transportation of equipment comprising fishing rods and reels. The case 10 may be shaped to conform generally to most sizes and shapes of fishing rods and reels.

In addition, the front member 14 and the rear member 16 are preferably padded, partially or completely, by soft material comprising foam in order to prevent damage to transported and stored equipment.

FIG. 5 demonstrates a fully retracted adjustable, telescopic, carrying and storage case 10 of a minimum fixed length when the case 10 is in a fully retracted position 200. The central longitudinal axis 15 remains unchanged for both the adjustable front member 14 and the adjustable rear member 16 when the case 10 is in the fully retracted position 200. The adjustable front member 14 and rear member 16 are both shorter than, the length of the carrying and storage case 10 when in the fully retracted position 200. The rear member 16 is concentric with the front member 14 when the rear member 16 and the front member 14 are connected to each other.

The plurality of rear telescopic locking sections 19 of variable length is retracted into close proximity to one another.

The number of primary rear telescopic locking sections 35 is arranged inside, next to and following the carrying and storage case 10 when in retracted position and a final rear telescopic locking section 75 is arranged inside, next to and following the number of primary rear telescopic locking sections 35. The number of primary rear telescopic locking sections 35 is slidable through and into the open rear end 23 of the second container portion 17. Each of the number of primary rear telescopic locking sections 35 is slidable through and into the open rear end of a previous number of rear telescopic locking sections 35, if the number of primary rear telescopic locking sections is greater than one, to form the rear member 16 in the fully retracted position 200. The rear end of the second container portion 23 and the number of rear ends 39 of the number of primary rear telescopic locking sections 35 comprise cooperating locking surfaces to retain the case 10 in the fully retracted position 200.

The plurality of rear annular locking surfaces 87 are located adjacent to the number of open rear ends 39 of the number of primary rear telescopic locking sections 35. Each of the plurality of rear annular locking surfaces 87 acts as an interlocking element to lock each of the number of primary rear telescopic locking sections 35 with the open rear end 23 of the second container portion 17 and the open rear end of the number of primary rear telescopic locking sections 35 (if the number of primary rear telescopic locking sections 35 is greater than one) with each following rear telescopic locking section, respectively.

The first container portion 18 contains the plurality of front telescopic locking sections 20 that are retracted into close proximity to one another. The plurality of the front telescopic locking sections 20 preferably has a number of primary front telescopic locking sections 36 arranged inside, next to and following the final rear telescopic locking section 75 and a final front telescopic locking section 76 arranged inside, next to and following the number of primary front locking sections 36 The number of primary front telescopic locking sections 36 and the final front telescopic locking section 75 include cooperating locking surfaces to retain the case 10 in the fully retracted position 200.

As shown in FIG. 4 in detail, a set of annular interlocking indentations are located adjacent to each end of each of the number of primary front telescopic locking sections 36, adjacent to each end of the final front telescopic locking section 76, adjacent to each end of the number of primary rear telescopic locking sections 35, and each end of the final rear telescopic locking section 75. Each set of annular interlocking indentations have an essentially similar shape. However, each indentation is slightly larger than the set of annular interlocking indentations located adjacent to the rear end of an adjacent locking section. Each of the adjacent set of annular interlocking indentations acts as an interlocking element to lock the number of primary 36, and the final 76 front locking sections with each adjacent locking section, and to lock the number of primary 35 and the final 75 rear telescopic locking sections with each adjacent telescopic locking section respectively.

A number of front annular tapered locking surfaces 88 (see FIG. 2) are located adjacent to the number of open front ends 58 of the number of primary front telescopic locking sections 36. Each of the number of front annular tapered locking surfaces 88 is located at an angle with the longitudinal axis 15. Each of the number of front annular tapered locking surfaces 88 acts as an interlocking element to lock each of the number of open front ends 58 of each of the number of primary front telescopic locking sections 36 with the open front end 58 of each adjacent primary front telescopic locking section 36, respectively, if the number of primary front telescopic locking sections 36 is greater than one.

The rear member 16 is connectable to the front member 14 through the front lip 25 located adjacent to the open front end 21 of the second container portion 17 interlocking with the rear lip 26 located adjacent to the rear end 24 of the first container portion 18. The front lip 25 of the second container portion 17 and the rear lip 26 of the first container portion 18 act as a set of interlocking elements to keep the open front end 21 of the second container portion 17 in an interlocked relationship with the rear end 24 of the first container portion 18 and to retain the carrying and storage case 10 in a stable condition when in retracted position.

Preferably, in the carrying and storage case 10, the open front end 78 of the front member 14 and the open rear end 79 of the rear member 16 are closed by using caps 73 made of materials comprising plastic. An option is to assure that the final front telescopic locking section 76 comprises a closed front end 78 and to assure that the final rear telescopic locking section 75 comprises a closed rear end 79, with the closed front end 78 being an integral part of the final front telescopic locking section 76 and the closed rear end 79 being an integral part of the final rear telescopic locking section 75. In addition, the final front telescopic locking section 76 preferably comprises a pull tab 71 which may extend outside the final front telescopic locking section 76 and is preferably located adjacent to the closed front end 78 on one side and adjacent to a retainer ring 69 retaining a soft material comprising foam on an opposite side.

Preferably, the carrying and storage case 10 is retracted to a minimum fixed length, when the case is in the fully retracted position 200. Preferably, the case is extended to a maximum fixed length, when the case 10 is in a fully extended position 100 (i.e., the front telescopic locking sections 20 and the rear telescopic locking sections 19 are extended to a maximum). Preferably, the minimum fixed length of the case 10 is approximately $\frac{1}{8}$th of the maximum fixed length of the case 10, and the maximum fixed length of the case 10 is preferably reduced to up to approximately $\frac{1}{8}$th of the maximum length of the front member 14 and the rear member 16 when fully extended.

Several prototypes have, been prepared successfully. An example of the carrying and storage case which has been prepared comprises a cylindrical member with a five-inch diameter and a twelve and one-half inch length of the containers. The sample comprises five front telescopic locking sections and two rear telescopic locking sections. A typical shape that is preferably used for the front and rear telescopic locking sections is a cylinder. An interlocking handle is preferably used on the front and rear members to facilitate transportation.

What is claimed is:

1. An adjustable, telescopic, carrying and storage case of variable length in an extended position comprising:
    (a) a hollow, adjustable front member of variable length with a central longitudinal axis, and
    (b) a hollow, adjustable rear member of variable length with the same central longitudinal axis, the rear member being concentric with the front member when the front member and the rear member are connected to each other,
    (a) wherein the hollow, adjustable front member comprises:
        1. a hollow first container portion, and
        2. a plurality of adjustable front telescopic locking sections of variable length, the hollow first container portion comprising an open front end and an open rear end, a rear lip located adjacent to the open rear end, a body comprising a top part and a bottom part, the body connecting the open front end to the open rear end of the first container portion, the first container portion connectable in a telescopic relation to the plurality of adjustable front telescopic, locking sections of variable length, wherein the plurality of adjustable front telescopic locking sections comprises a number of primary adjustable front telescopic locking sections with a number of open rear ends telescopically following the first container portion, said number of open rear ends telescopically following each other, and a number of open front ends which is arranged telescopically with respect to each other, and a final adjustable front telescopic locking section with a closed front end and an open rear end following the number of primary adjustable front telescopic locking sections, the first container portion arranged telescopically in relation to the number of primary adjustable front telescopic locking sections, and the number of primary adjustable front telescopic locking sections arranged in a telescopic relation with each other and with the final adjustable front telescopic locking section for movement between a retracted position of the adjustable, telescopic, carrying and storage case and an extended position of the case, the number of primary adjustable front telescopic locking sections slidable through the open front end of the first container portion, and the final adjustable front telescopic locking section slidable through one of the number of open front ends of the number of primary adjustable front telescopic locking sections which is farthest from the first container portion, the plurality of adjustable front telescopic locking sections comprising a plurality of front annular tapered locking surfaces and a plurality of rear annular tapered locking surfaces for retaining the plurality of adjustable front telescopic locking sections in an interlocked relationship when the case is in an extended position, wherein a front annular tapered locking surface, located adjacent to the open front end of the first container portion and a number of front annular tapered locking surfaces located adjacent to the open front end of the number of primary adjustable front telescopic locking sections, a number of primary rear annular tapered locking surfaces located adjacent to the respective number of rear ends of the number of primary adjustable front telescopic locking sections, and a final rear annular tapered locking surface located adjacent to the rear end of the final adjustable front telescopic locking section, being in a position such that the plurality of front annular tapered locking surfaces and the plurality of rear annular tapered locking surfaces acting as pairs of interlocking elements to lock the open front end of the first container portion and of the number of open front ends of the number of primary adjustable front telescopic locking sections with the number of open rear ends of the number of primary adjustable front telescopic locking sections and with the open rear end of the final adjustable front telescopic locking section, with each end telescopically locked with the following end, (b) wherein the hollow, adjustable rear member comprises:

1. a hollow second container portion, and
2. a plurality of adjustable rear telescopic locking sections of variable length, the hollow second container portion comprising an open front end and an open rear end, a front lip located adjacent to the open front end of the second container portion, a body comprising a top part and a bottom part, the body connecting the open front end to the open rear end of the second container portion, the second container portion connectable in a telescopic relation to the plurality of adjustable rear telescopic locking sections of variable length, wherein the plurality of adjustable rear telescopic locking sections comprises a number of primary adjustable rear telescopic locking sections with a number of open rear ends telescopically following the second container portion, said number of open rear ends telescopically following each other and a number of open front ends which are arranged telescopically with respect to each other and a final adjustable rear telescopic locking section with an open front end and a closed rear end following the number of primary adjustable rear telescopic locking sections, the number of primary adjustable rear telescopic locking sections arranged telescopically in relation to the second container portion and with respect to each other and in relation to the final adjustable rear telescopic locking section for movement between a retracted position of the adjustable, telescopic, carrying and storage case and an extended position of the case, the number of primary adjustable rear telescopic locking sections slidable through the open rear end of the second container portion and through the number of open rear ends of each other and the final adjustable rear telescopic locking section slidable through one of the number of open rear ends of the number of primary adjustable rear telescopic locking sections which is the farthest from the second container portion, the plurality of adjustable rear telescopic locking sections comprising a plurality of front locking surfaces and a plurality of rear locking surfaces for retaining the plurality of adjustable rear telescopic locking sections in an interlocked relationship when the case is extended, wherein a plurality of front annular tapered locking surfaces is located adjacent to each of the number of front ends of the plurality of adjustable rear telescopic locking sections and a plurality of rear annular tapered locking surfaces is located adjacent to each of the number of rear ends of the plurality of adjustable rear telescopic locking sections, such that the number of primary front annular tapered locking surfaces located adjacent to the respective number of open front ends of the number of primary adjustable rear telescopic locking sections, and a final front annular tapered locking surface located adjacent to the open front end of the final adjustable rear telescopic locking section, a rear annular tapered locking surface located adjacent to the open rear end of the second container portion, a number of primary rear annular tapered locking surfaces located adjacent to the respective number of rear ends of the number of primary adjustable rear telescopic locking sections, the plurality of front annular tapered locking surfaces and the plurality of rear annular tapered locking surfaces acting as pairs of interlocking elements to lock the open rear end of the second container portion and of the number of open rear ends of the number of primary adjustable front telescopic locking sections with the open front end of the primary adjustable rear telescopic locking section, and with the open front end of the final rear telescopic locking section, with each end telescopically locked with the following end, the adjustable rear member connectable to the adjustable front member through the front lip located adjacent to the open front end of the second container portion and the rear lip located adjacent to the open rear end of the first container portion, the front lip and the rear lip acting as a set of interlocking elements to keep the front end of the second container portion in an interlocked relationship with the rear end of the first container portion and to retain the carrying and storage case in a stable condition.

2. A carrying and storage case according to claim 1, wherein a first hollow rigid handle is located on the top part of the body of the first container portion and is an integral part of the first container portion, the first handle extending between a first position adjacent to the open front end of the first container portion and a second position adjacent to the open rear end of the first container portion.

3. A carrying and storage case according to claim 1, wherein a second hollow rigid handle is located on the top part of the body of the second container portion and is an integral part of the second container portion, the second handle extending between a first location adjacent to the open front end of the second container portion and a second location adjacent to the open rear end of the second container portion.

4. A carrying and storage case according to claim 1, wherein at least one of the first and second handles is integrally formed with the respective container portion.

5. A carrying and storage case according to claim 1, wherein the final adjustable front telescopic locking section comprises an open front end and wherein the final adjustable rear telescopic locking section comprises an open rear end, the open front end being an integral part of the final adjustable front telescopic locking section and the open rear end being an integral part of the final adjustable rear telescopic locking section.

6. A carrying and storage case according to claim 1, wherein the front end of the adjustable front member and the rear end of the adjustable rear member are covered by using caps made of material comprising plastic.

7. A carrying and storage case according to claim 1, wherein the case is approximately cylindrical in form, wherein the bottom part of the first container portion and the bottom part of the second container portion are partially flattened, and the bottom parts are partially creased to avoid slipperiness and to increase rigidity.

8. A carrying and storage case according to claim 1, wherein the front member and the rear member are formed by blow molding.

9. A carrying and storage case according to claim 1, wherein the case is used for the storage and transportation of equipment comprising fishing rods and reels and the case is shaped to conform generally to most sizes and shapes of fishing rods and reels.

10. A carrying and storage case according to claim 1, wherein the front member and the rear member are padded, partially or completely, by soft material comprising foam in order to prevent damage to transported and stored equipment.

11. An adjustable, telescopic, carrying and storage case of a minimum fixed length when the case is in a fully retracted position comprising:
(a) an adjustable front member with a longitudinal axis and shorter than the length of the carrying and storage case when in the fully retracted position, and
(b) an adjustable rear member with a longitudinal axis and shorter than the length of the carrying and storage case when in the fully retracted position, the rear member being concentric with the front member when the rear member and the front member are connected to each other,
(a) wherein the rear member comprises:
a second container portion and a plurality of rear telescopic locking sections of variable length,
the second container portion comprising an open front end and an open rear end, a front lip located adjacent to the open front end of the second container portion, a body comprising a top part and a bottom part, the body connecting the open front end to the open rear end of the second container portion, the second container portion containing the plurality of rear telescopic locking sections of variable length that are retracted into close proximity to one another, the plurality of the rear telescopic locking sections having an open front end and an open rear end and comprising a number of primary rear telescopic locking sections arranged inside, next to and following the carrying and storage case when in retracted position, and a final rear telescopic locking section arranged inside, next to and following the number of primary rear telescopic locking sections, the number of primary rear telescopic locking sections slidable through and into the open rear end of the second container portion and each of the number of rear telescopic locking sections slidable through and into the open rear end of a previous number of rear telescopic locking sections to form the rear member in the fully retracted position, the rear end of the second container portion and the number of rear ends of the number of primary rear telescopic locking sections comprising cooperating locking surfaces to retain the case in the fully retracted position,
wherein a plurality of rear annular locking surfaces, being located adjacent to the number of open rear ends of the number of primary telescopic locking sections, each of the plurality of rear annular locking surfaces acting as an interlocking element to lock each of the number of primary rear telescopic locking sections with the open rear end of the second container portion and the open rear end of the number of primary rear telescopic locking sections with each following rear telescopic locking section, respectively,
(b) wherein the front member comprises a first container portion and a plurality of adjustable front telescopic locking sections of variable length, the first container portion comprising an open front end and an open rear end, a rear lip located adjacent to the open rear end of the first container portion, a body comprising a top part and a bottom part, the body connecting the open front end and the open rear end of the first container portion,
the first container portion containing the plurality of front telescopic locking sections that are retracted into close proximity to one another, the plurality of the front telescopic locking sections having an open front end and an open rear end and comprising a number of primary front telescopic locking sections arranged inside, next to and following the final rear telescopic locking section, and a final front telescopic locking section arranged inside, next to and following the number of primary front locking sections, the rear end of the plurality of front telescopic locking sections including cooperating locking surfaces to retain the case in the fully retracted position, wherein a set of annular interlocking indentations, located adjacent to each end of each of the number of primary front telescopic locking sections, to each end of the final front telescopic locking section, adjacent to each end of the number of primary rear telescopic locking sections and each end of the final rear telescopic locking section, each set of annular interlocking indentations having a shape substantially the same, but slightly larger than, the set of annular interlocking indentations located adjacent to the rear end of an adjacent locking section, each of the adjacent set of annular interlocking indentations acting as an interlocking element to lock the number of primary front locking sections and the final front locking section with each adjacent locking section, and to lock the number of primary rear telescopic locking sections and the final rear telescopic locking section with each adjacent telescopic locking section, respectively, wherein a number of front annular tapered locking surfaces, located adjacent to the number of open front ends of the number of primary front telescopic locking sections, each of the number of front annular tapered locking surfaces acting as an interlocking element to lock each of the number of open front ends of each of the number of primary front telescopic locking sections with the open front ends of each adjacent primary front telescopic locking section, respectively, the rear member connectable to the front member through the front lip located adjacent to the open front end of the second container portion, the front lip of the second container portion and the rear lip of the first container portion acting as a set of interlocking elements to keep the front end of the second container portion in an interlocked relationship with the rear end of the first container portion and to retain the carrying and storage case in a stable condition.

12. A carrying and storage case according to claim 11, wherein a first hollow rigid handle is located on the top part and is an integral part of the body of the first container portion, the handle extending between a first position adjacent to the open front end of the first container portion and a second position adjacent to the open rear end of the first container portion.

13. A carrying and storage case according to claim 11, wherein a second hollow rigid handle is located on the top part of the body of the second container portion and is an integral part of the second container portion, the handle extending between a first location adjacent to the open front end of the second container portion and a second location adjacent to the open rear end of the second container portion.

14. A carrying and storage case according to claim 11, wherein the open front end of the front member and the open rear end of the rear member are closed by using caps made of materials comprising plastic.

15. A carrying and storage case according to claim 11, wherein the final front telescopic locking section comprises a closed front end and wherein the final rear telescopic locking section comprises a closed rear end, the closed front end being an integral part of the final front telescopic locking section and the closed rear end being an integral part of the final rear telescopic locking section, and the final front telescopic locking section comprising a pull tab extending outside the final front telescopic locking section and located adjacent to the closed from end and adjacent to a retainer ring retaining a soft material comprising foam.

16. A carrying and storage case according to claim 11, wherein the case is preferably retracted to a minimum fixed length, when the case is in the fully retracted position, and the case is preferably extended to a maximum fixed length, when the case is in a fully extended position and the front and the rear telescopic locking sections are extended to a maximum, the minimum fixed length of the case is preferably approximately ⅓th of the maximum fixed length of the case, and the maximum fixed length of the case is preferably reduced to up to approximately ⅓th of the variable length of the front and the rear sections.

* * * * *